Patented Oct. 31, 1950

2,528,347

UNITED STATES PATENT OFFICE 2,528,347

NONFLAMMABLE HYDRAULIC FLUID

George H. Denison, Jr., San Rafael, Neal W. Furby, El Cerrito, and Robert O. Bolt, Richmond, Calif., assignors to California Research Corporation, San Francisco, Calif., a corporation of Delaware No Drawing. Application July 13, 1948, Serial No. 38,554

2 Claims. (Cl. 252—75)

The present invention relates to the preparation of hydraulic fluids, and more particularly to hydraulic fluid compositions of improved nonflammability characteristics.

Considerable effort has been expended in the search of a suitable hydraulic fluid resistant to fire, particularly for use in hydraulic systems of aircraft machines. Strong evidence indicating that aircraft fires may be due to, or, at least, aggravated by, the use of flammable fluids in aircraft hydraulic systems has been accumulated. It has been found, for example, that leakage of fluid from aircraft hydraulic systems may occur, the fluid accumulating in pockets or impregnating insulating material used in the chassis of the plane, thus creating serious fire hazards. It has also been observed that ruptured hydraulic lines carrying a flammable hydraulic fluid under pressure have added to the intensity and seriousness of aircraft fires by the spraying of combustible fluids thereinto or by burning with torch-like effect. In spite of precautions taken to prevent leakage of hydraulic fluid, the use of flammable hydraulic fluids represents a serious fire hazard, and the most satisfactory expedient of overcoming the problem seems to be the development of nonflammable materials suitable for hydraulic use.

An object of the invention is to prepare hydraulic fluid compositions having superior fire retarding characteristics.

A more specific object of the invention is to prepare a hydraulic fluid having superior nonflammability characteristics for use in aircraft hydraulic systems.

Other objects and advantages of the invention will be apparent from the following description of the invention.

The present invention is predicated on the discovery that certain halogenated olefins, for example, hexachlorobutadiene; and a material, hereinafter more fully described, effective as a corrosion inhibiting agent therefor, may be combined to form a noncorrosive composition or mixture having superior nonflammability characteristics.

To the combination of the aforesaid ingredients we may add other components or ingredients to effect a final composition having properties which adapt the composition for particular uses or applications. For example, in addition to the property of nonflammability and the properties hereinabove indicated, it is desirable that in highly specialized uses, such as in aircraft use, the hydraulic medium have fluidity at the low temperatures encountered in operation. Moreover, it is important that hydraulic fluids for use in aircraft exhibit good shear characteristics, that is, that they retain body and viscosity when subjected to the shearing action of hydraulic pumps and when passing through small openings or orifices at high pressure. These and other properties of a suitable hydraulic fluid are defined by rigid specifications as will hereinafter more fully appear.

More particularly, the chlorinated materials contemplated by the present invention are normally liquid aliphatic compounds or mixtures thereof preferably containing at least chemically equivalent amounts of chlorine and hydrogen, that is, at least as many chlorine atoms as hydrogen atoms. These chlorinated materials or compounds are further characterized by the fact that the chlorine atoms are attached to unsaturated carbon atoms, whereby the tendency of corrosive hydrogen chloride to split out is minimized. Compounds falling within the foregoing definition have been found susceptible to stabilization against corrosion although present in the composition in large amounts.

In general, the chlorinated aliphatic materials, containing at least as many chlorine atoms as hydrogen atoms, contemplated by the present invention, may be represented by the formula $$R\text{---}CCl\text{=}CCl\text{---}R_1$$

wherein C and Cl represent or stand for carbon and chlorine, respectively; R, chlorine, hydrogen or an alkyl group; and $R_1$, chlorine or a chlorine-substituted aliphatic group with halogen atoms attached to vinylene (—C=C—) carbon atoms, the vinylene carbon atoms holding at least one chlorine atom each.

Specific examples of normally liquid chlorinated olefins useful for purposes of the present invention are hexachloro-1,3-butadiene, dichloroethylene, trichloroethylene, tetrachloroethylene, octachloro-1,3,5-hexatriene, 1,1,2-trichloropropene, 1,1,2,3,4 - pentachloro - 1,3 - butadiene, 1,1,2,3,4-pentachloro-1,3-pentadiene, 1,2,3,4-tetrachloro-1,3-pentadiene, 1,1,2,3,4-pentachloro-1,3-hexadiene.

As corrosion inhibiting agents the invention contemplates basic compounds compatible with the chlorinated aliphatic material and soluble therein. The corrosion prevention agents may be represented by the formula M(YR)x wherein M is a metal falling within groups I to IV, inclusive, of the periodic table; Y is a non-metallic element taken from group VI of the periodic table, such as oxygen and sulfur; R is an organic radical, aliphatic or aromatic, of preferably at least six carbon atoms; and X is a numeral corresponding to the valence of metal M.

Inhibitors most advantageously employed in accordance with the present invention are alkaline earth metal phenates, such as magnesium phenates, strontium phenates, and calcium phenates, and are preferably formed from high molecular weight substituted phenols, the substituent group being alkyl, aralkyl, or cyclic non-benzenoid groups. A description of the aforesaid types of inhibitors and the preparation thereof is given in U. S. Patent 2,228,661, according to which patent alkaline earth metal phenates of molecular weight greater than about 100 and containing more than 10 carbon atoms, and preferably 16 or more carbon atoms, are preferred.

Specific examples of inhibitors contemplated by the present invention are aliphatic derivatives, such as lithium, sodium, potassium, calcium, tin, aluminum, and magnesium octadecylate, calcium laurylate, magnesium cetylate, calcium dodecylate, calcium lauryl mercaptide, barium octadecyl mercaptide, and aromatic derivatives, such as barium cetylphenate, calcium cetylphenate, calcium diamylphenate, calcium p-tertiary-amyl-phenate, barium tertiary-amylphenate sulfide, magnesium tertiary-amylphenate sulfide.

The properties or qualities desired in a hydraulic fluid are defined by specifications which may vary with the particular use or application to which the hydraulic fluid is desired to be put. For example, hydraulic fluids for use in hydraulic equipment of aircraft machines, seagoing ships, and fluid couplings and torque converters are generally required to have low pour points, while, on the other hand, low pour points are not particularly required in other hydraulic equipment, such as in presses and die casting machines. Other properties, such as viscosity, viscosity index, specific gravity, etc., may vary widely, depending on the use of the hydraulic fluid. Particularly severe and exacting are the requirements or specifications of hydraulic fluids for use in aircraft machines. The hydraulic fluids contemplated by the present invention are useful wherever flammability of the fluid is an undesirable property, and may be adapted to meet increasingly exacting requirements of a given use.

One of the tests that may be employed for the evaluation of the flammability characteristics of hydraulic fluid is the so-called Autogenous Ignition Temperature test (A. I. T.), ASTM Designation D286-30. According to this test, various amounts of samples of test material are admitted from a pipette to a flask immersed in a solder bath and the minimum ignition temperature determined. While in certain applications, for example, torque converters, a suitable minimum ignition temperature may be around 550° F., a minimum ignition temperature of about 750° F. is preferred for aircraft hydraulic systems.

Another test that may be performed on hydraulic fluids is the corrosion and oxidation stability test. This test is particularly useful in the evaluation of aircraft hydraulic fluids, and is described in Army-Navy Aeronautical Specification AN-O-366 and Federal Specification VV-L-791C, Method 530.8. In carrying out this test, 100 ml. of the test fluid and weighed strips approximately one inch square of copper (Specification QQ-C-501), low carbon steel (Specification AN-QQ-S-676), aluminum alloy (Specification QQ-A-355), magnesium alloy (Specification AN-M-30), and cadmium plated steel (Specification AN-P-61) are placed in a large pyrex test tube provided with a tightly fitting stopper and a water-cooled reflux condenser. The metals are arranged in such manner that magnesium touches aluminum and steel, but not copper.

The test tube with contents is placed in a thermostatically controlled bath maintained at a temperature of 250° F. Dry air is introduced into the test tube at a rate of approximately 5 liters per hour through a glass tube, one end of which has been drawn to an orifice having a diameter of $\frac{1}{16}$ inch and extending well to the bottom of the test tube. At the end of 168 hours, the oxidation is discontinued, and the weight change of the assembly noted. The oil is examined visually for separation of insoluble material or gumming and the viscosity and neutralization number of the oil are determined according to Section F of Specification AN-O-366. The metal specimens are washed in C. P. benzene, then in acetone, and then dried before reweighing. They are also examined for appearance and pitting or corrosion under a magnification of 20 diameters.

A further important test that may be performed on the hydraulic fluids herein contemplated is the pour point test, as described in ASTM Designation D97-47. The pour point of a fluid is the lowest temperature at which it will flow or pour when chilled under controlled conditions. The pour point will vary widely with the use of the fluid. Thus, in die casting machines which are ordinarily not subject to temperatures much below ordinary room temperatures of around 70° F., a low pour point is not particularly desired. On the other hand, operational temperatures of aircraft machines vary widely and may change abruptly, and it is desirable that aircraft hydraulic fluids have a pour point not above about −20° F. and preferably between the range of about −45° F. and about −70° F. and lower.

The following is given as an illustration of the relative proportions of the essential two ingredients of the herein contemplated compositions:

*Example I*

| Ingredient: | Parts by weight |
|---|---|
| Chlorinated Olefin | 20–95 |
| Corrosion Inhibitor | 0.1–20 |

Preferred amounts of inhibitor, or inhibiting agent, range from about 2 to about 12 parts.

Compositions made up within about the foregoing range of proportioned amounts of ingredients show viscosities between about 1 centistoke at 100° F. and about 5 centistokes at 210° F., an Autogenous Ignition Temperature from about 750 to 1200° F. and a maximum corrosion of about 0.2 mg., these data being obtained from tests hereinabove described.

To the compositions made up of the two ingredients hereinabove described we may impart further improved properties or increase those present in the desired direction to produce improved effects.

Thus, when it is desired to lower the pour point of the composition, such effect may be accomplished by the addition to the composition of a sufficient amount of a material capable of depressing or lowering the freezing point thereof, and in certain cases, such as with 1,2,4-trichlorobenzene and hexachlorobutadiene, forming a eutectic mixture.

Illustrative of freezing point depressing materials are certain halogenated aromatic hydrocarbons, such as certain chlorinated benzenes, for example, mono-, di-, tri-, tetra-, and pentachlorbenzene, which have sharp melting points and are capable of forming eutectic mixtures with the chlorinated olefin material; mixtures which have no true melting point but solidify to amorphous glass-like materials, such as chlorinated naphthalenes and biphenyls. In place of the chlorinated derivatives hereinabove mentioned, other halogenated derivatives, such as brominated and fluorinated compounds may be advantageously employed. Examples of other suitable freezing point depressing substances which solidify to an amorphous glass-like form are alkaryl, diaryl, and alkaryl aryl ethers of molecular weight, for example, between about 100 and 400; and esters, such as dimethyl, diethyl and dibutyl phthalate, having molecular weights between about 200 and 500. We have found that we may incorporate into the compositions from about 5 to about 40 per cent, and preferably about 15 to 30 per cent, of a freezing point depressing substance, thus effecting compositions having pour points from about $-20°$ F. to about $-70°$ F. and lower.

As illustrative of compositions contemplated by the present invention consisting essentially of three components, the following is given:

Example II

| Ingredient: | Parts by weight |
| --- | --- |
| Chlorinated olefin | 40–94 |
| Inhibitor | 0.1–20 |
| Freezing point depressant | 5–40 |

A more specific example illustrating the composition comprising three components is as follows:

Example III

| Ingredients: | Percent by weight |
| --- | --- |
| Hexachlorobutadiene | 75 |
| Calcium cetylphenate | 10 |
| Trichlorobenzene | 15 |

On analysis the composition illustrated above had a viscosity of 2 centistokes at 100° F., an A. I. T. of 1100° F., and a pour point of $-20°$ F.

A further specific illustration of three components contemplated by the present invention is as follows:

Example IV

| Ingredients: | Percent by weight |
| --- | --- |
| Hexachlorobutadiene | 61 |
| Calcium cetyl phenate | 10 |
| Chlorinated biphenyl (48% chlorine) | 19 |
| Trichlorobenzene | 10 |

The foregoing composition, on analysis, showed a pour point of $-50°$ F., a viscosity of 6 centistokes at 130° F., and an A. I. T. of about 900° F.

Other examples of nonflammable hydraulic fluid compositions are as follows:

Example V

| Ingredients: | Percent by weight |
| --- | --- |
| Trichloroethylene | 82 |
| Calcium dodecylate | 18 |

The foregoing composition had about the following properties: Pour point, $-40°$ F.; autogenous ignition temperature (A. I. T.) 900° F.; viscosity, 2 centistokes at 130° F.

Example VI

| Ingredients: | Percent by weight |
| --- | --- |
| Tetrachloroethylene | 85 |
| Barium octylnaphthylate | 15 |

The following properties characterized the foregoing composition: Pour point, below about $-20°$ F.; A. I. T., about 1000° F.; viscosity, about 2.5 centistokes at 130° F.

Example VII

| Ingredients: | Percent by weight |
| --- | --- |
| Octachlorohexatriene | 90 |
| Calcium octylphenate | 10 |

On analysis, the foregoing composition had about the following properties: Pour point, below 0° F.; A. I. T., 1000° F.; viscosity, 2.5 centistokes at 130° F.

Hydraulic fluids for use in aircraft hydraulic systems are desired to have good wear characteristics. Accordingly, a test described under paragraph F-4g(1) of the Army-Navy specification hereinabove mentioned has been devised for the determination of the wear properties of hydraulic fluids for use in aircraft. According to this test, known as the Pumping Test, a number of samples of the fluid are run through a pump system a different number of cycles and any ill effects, such as weight loss, evidence of corrosion and scoring, on the various parts or loosening thereof are noted. The foregoing test is also useful for determining shear stability of the fluid. After the fluid is pumped for 5,000 cycles under the conditions and in the apparatus described above, the viscosity change in centistokes at 130° F. and at $-40°$ F. is determined. A satisfactory fluid exhibits a viscosity change not exceeding 15 per cent of that of the original oil.

We have found that the addition of an anti-wear agent to the composition improves the wear characteristics thereof. Suitable anti-wear agents are simple, mixed or combined phosphate esters, that is, alkyl, aryl, alkaryl, or cycloalkyl phosphates, soluble in the composition. Specific examples of phosphate esters are tricresyl phosphate, cresyl diphenyl phosphate, nonyl diphenyl phosphate, and tributyl phosphate. An amount of anti-wear agent ranging from about 0.1 per cent to about 5 per cent based on the composition has been found satisfactory. A preferred amount is about 2 per cent.

In addition to improving the wear characteristics of the compositions herein contemplated, the phosphate esters aforementioned may also serve to depress the freezing point of the composition, and in some cases they may be used alone to effect both a depression of the freezing point and to impart improved wear properties to the fluid.

In the event it is desired to improve the viscosity index of the hydraulic fluid compositions of the present invention, a viscosity index (V. I.) improver may be incorporated in the compositions. Any suitable lubricating oil viscosity improver soluble in the composition may be employed. For example, the materials disclosed in U. S. Patent 2,091,627; namely, the oil-soluble polymerized esters of the acrylic acid or vinyl ester series of molecular weights between about 5,000 and 100,000, or lower or higher, have been found especially satisfactory for purposes of the present invention. Specific examples are the polymerization products of esters formed by the reaction of alpha-methacrylic acid with lauryl, cetyl, and octadecyl alcohols. Examples of other suitable V. I. improvers are polymers of butenes having molecular weights ranging from about 2,000 to 20,000 and which are soluble in the fluids at the low temperatures encountered in use. Satisfactory amounts of V. I. improvers in the compositions may range from as little as about 0.1 to as high as about 10 per cent and amounts in excess of about 10 per cent or less desirable as causing failure of the hydraulic fluid to pass the Pumping Test.

In the event it is desired to inhibit rusting of the fluid, we may add other ingredients to effect these results. For example, a detergent or wetting agent, that is, an alkali or alkaline earth metal organic sulfonate, such as sodium white oil sulfonate, sodium lauryl sulfonate, calcium octadecyl sulfonate, barium cetylbenzene sulfonate, may be added in amounts of about 0.1 per cent to 5 per cent to inhibit rusting.

In general, compositions composed of the following ingredients present within about the following proportions by weight per cent have been found to meet most stringent requirements of a nonflammable hydraulic fluid.

Ingredients:                          Parts per cent by weight
    Chlorinated olefin _____   40–94
    Corrosion inhibitor _____   0.1–20
    Freezing point depressant _____   5–40
    Anti-wear agent _____   0.1–5
    Viscosity index improver _____   0.1–20
    Rust inhibitor _____   0.1–10
    Foam inhibitor _____   .0001–0.1

Compositions made up within the foregoing proportion of ingredients exhibit good wear characteristics, meet corrosion specifications for aircraft hydraulic fluids, have autogenous ignition temperatures between about 750° F. and 1200° F., and viscosities between about 2 and 16 centistokes at 130° F.

As a specific example of a suitable nonflammable aircraft hydraulic fluid, the following is given, the ingredients being present in about the amounts indicated:

Ingredients:                          Per cent by weight
    Hexachlorobutadiene _____   64.9
    Calcium cetyl phenate _____   5.0
    Chlorinated biphenyl (48% chlorine)_   13.3
    Trichlorobenzene _____   10.3
    Tricresyl phosphate _____   2.1
    Lauryl methacrylate polymer (mol. wt. about 15,000) _____   3.3
    Sodium white oil sulfonate _____   1.1
                                       ─────
                                       100.0

To the above composition there was added dimethyl silicone polymer (mol. wt. about 5000) anti-foaming agent in an amount by weight of 0.0005 part per 100 parts of the composition.

The following inspections were obtained from the foregoing formulation.

Flash point, 0° F.—No true flash point
Specific gravity at 60° F./60° F., 1.495
Viscosity at 210° F., centistokes, 2.85
Viscosity at 130° F., centistokes, 5.98
Viscosity at 100° F., centistokes, 8.55
Viscosity at —40° F., centistokes, 425
Viscosity index, 193
Pour point 0° F., below —70
Low temp. stability (6 days storage at —60° F.)— Remains fluid
Neutralization No., nil
Shear breakdown—Less than 10 per cent change viscosity

| Oxidation and Corrosion (168 hours at 250° F.) | Appearance | Weight Loss Mg./Sq. cm. |
|---|---|---|
| Bronze | Bright | 0.02 |
| Carbon Steel | | 0.04 |
| Magnesium Alloy | | 0.02 |
| Cadmium Plated Steel | | 0.01 |
| Aluminum Alloy | | 0.01 |

Autogenous ignition temp., °F., 1000.

Low temperature stability of the fluid above mentioned was determined by subjecting the fluid to the test described under paragraph E–7 of the Army-Navy Aeronautical Specification AN–O–366 hereinabove mentioned. According to this test, the test fluid is maintained at a temperature not above —65° F. for 72 hours. A satisfactory fluid does not gel, crystallize, solidify, or show evidence of separation of insoluble material after being subjected to these conditions.

To further evaluate the nonflammability characteristics of the compositioned fluid above described, the fluid was subjected to a number of flammability tests. In one test, known as the "Fiber Glass Test," a piece of glass cloth was soaked in the fluid drained and ignited by a cold Bunsen flame. The fluid was self-extinguishing while conventional fluids continued to burn.

In another test, the "Exhaust Pipe Test," the fluid was allowed to drip on a hot exhaust pipe with the surface temperature at about 1600° F. No ignition of the fluid occurred, while conventional fluids ignited readily.

In the "Electric Arc Test," an accumulator and a short length of ½ inch steel tubing were pressurized to 1500 pounds per square inch with the fluid under test and a hole arced into the tubing by means of a 24 volt battery. Conventional fluids ignited readily, producing spectacular fires when subjected to this test, whereas the compositions of the present invention did not ignite at all.

A further experiment, known as the "Spray Gun Test," was conducted on the fluid of the present invention and conventional fluids. According to this test, the fluid under test is sprayed across a burning rag saturated with 1120 aviation oil. Conventional fluids give a spectacular roaring torch, whereas the present fluids extinguish the fire.

From the foregoing tests, it can readily be seen that the fluids of the present invention are nonflammable and, because of this property, overcome a serious fire hazard problem, particularly in the aircraft industry. Moreover, the fluids of the present invention are not only superior in nonflammability characteristics to known hydraulic fluids, but, also, as hereinabove shown, are capable of meeting the exacting requirements of aircraft hydraulic fluids concerning corrosion, wear, viscosity index, freezing point, etc.

The manner of compounding the compositions herein described is not critical. Any suitable equipment capable of effecting intimate admixture of the ingredients may be employed, and the ingredients may all be mixed at one time or mixed severally.

Obviously, many modifications and variations of the invention as hereinabove set forth may be made without departure from the spirit and scope thereof, and therefore only such limitations are to be imposed as are indicated in the appended claims.

We claim:
1. A nonflammable hydraulic fluid composition consisting essentially of about 40 to 94 parts by weight of hexachlorobutadiene; as a corrosion inhibiting agent for said hexachlorobutadiene, about 0.1 to 20 parts of an alkaline earth metal phenate soluble therein; as a freezing point depressing substance, about 5 to 40 parts of a mixture of chlorinated benzene and biphenyl; as an anti-wear agent, about 0.1 to 5 parts of a phosphate ester; as a viscosity index improver, about 0.1 to 20 parts of an oil-soluble polymerized ester of acrylic acid; as a rust inhibitor about 0.1 to 10 parts of sodium white oil sulfonate; said composition having a viscosity of about between 2 and 16 centistokes at 130° F., and an autogenous ignition temperature between about 750° F. and 1200° F.

2. A nonflammable hydraulic fluid composition consisting essentially of about 40 to 90 parts by weight of hexachlorobutadiene; as a corrosion inhibiting agent for said hexachlorobutadiene about 0.1 to 20 parts of an alkaline earth metal phenate soluble therein; as a freezing point depressing substance about 5 to 40 parts of material selected from the group consisting of chlorinated benzene, naphthalene and biphenyl, and mixtures thereof; as an anti-wear agent about 0.1 to 5 parts of a phosphate ester; as a viscosity index improver about 0.1 to 20 parts of an oil soluble polymerized ester of acrylic acid; as a rust inhibitor about 0.1 to 10 parts of sodium white oil sulfonate; said composition having a viscosity of about between 2 and 16 centistokes at 130° F., and an autogenous ignition temperature between about 750° F. and 1200° F.

GEORGE H. DENISON, JR.
NEAL W. FURBY.
ROBERT O. BOLT.

REFERENCES CITED

The following references are of record in the file of this patent:

UNITED STATES PATENTS

| Number | Name | Date |
| --- | --- | --- |
| 2,017,089 | Cox | Oct. 15, 1935 |
| 2,023,367 | Krekeler | Dec. 3, 1935 |
| 2,091,627 | Bruson | Aug. 31, 1937 |
| 2,102,638 | Moses | Dec. 21, 1937 |
| 2,102,825 | Woodhouse et al. | Dec. 21, 1937 |
| 2,175,877 | Clark | Oct. 10, 1939 |
| 2,228,661 | Gardiner et al. | Jan. 14, 1941 |
| 2,356,685 | Neely et al. | Aug. 22, 1944 |
| 2,413,170 | Clark | Dec. 24, 1946 |
| 2,423,927 | Burk et al. | July 15, 1947 |

FOREIGN PATENTS

| Number | Country | Date |
| --- | --- | --- |
| 430,741 | Great Britain | June 20, 1935 |

OTHER REFERENCES

Knight: "The Silicones—Truly New Materials," in Materials and Methods (formerly Metals and Alloys), Oct. 1945, table on page 1073.